United States Patent
Buelow et al.

(10) Patent No.: US 8,494,373 B2
(45) Date of Patent: Jul. 23, 2013

(54) APPARATUS AND METHOD FOR COMPENSATING POLARIZATION MODE DISPERSION

(75) Inventors: Henning Buelow, Kornwestheim (DE); Pierre Jaeger, Stuttgart (DE)

(73) Assignee: Alcatel Lucent, Paris (FR)

( * ) Notice: Subject to any disclaimer, the term of this patent is extended or adjusted under 35 U.S.C. 154(b) by 235 days.

(21) Appl. No.: 12/998,662

(22) PCT Filed: Nov. 28, 2008

(86) PCT No.: PCT/IB2008/055659
§ 371 (c)(1), (2), (4) Date: May 16, 2011

(87) PCT Pub. No.: WO2010/061247
PCT Pub. Date: Jun. 3, 2010

(65) Prior Publication Data
US 2011/0229143 A1    Sep. 22, 2011

(51) Int. Cl.
*H04B 10/00* (2006.01)

(52) U.S. Cl.
USPC .......................................... 398/159; 398/152

(58) Field of Classification Search
USPC .................. 398/65, 81, 147, 152, 158, 159
See application file for complete search history.

(56) References Cited

U.S. PATENT DOCUMENTS

| | | |
|---|---|---|
| 2002/0191265 A1 | 12/2002 | Lagasse et al. |
| 2003/0156776 A1* | 8/2003 | Han et al. ................... 385/11 |
| 2008/0205814 A1 | 8/2008 | Qiao et al. |
| 2011/0206375 A1* | 8/2011 | Xiong et al. ................. 398/65 |

FOREIGN PATENT DOCUMENTS

EP    1 916 786 A    4/2008

OTHER PUBLICATIONS

Schmidt, M. et al; Adaptive PMD Compensation for 170 Gbit/s RZ Transmission Systems with Alternating Polarisation; 2005 Optical Fiber Communications Conf. Tech Digest. (IEEE Cat. No. 05CH37672) IEEE Piscataway, NJ, USA; vol. 3, Mar. 6, 2005; pp. 468-470.

(Continued)

*Primary Examiner* — Dalzid Singh
(74) *Attorney, Agent, or Firm* — Carmen Patti Law Group, LLC

(57) ABSTRACT

An apparatus (PMDC) for compensating polarization mode dispersion for an optical transmission fiber (TF) for transmission of optical signals, said optical signals having a first polarization component (x pol) and a orthogonal second polarization component (y pol) comprises tuneable means (PC1, DL1, PC2, DL2) adapted to compensating said fiber polarization mode dispersion. It further comprises a feedback signal generator (FSG) adapted to generating a feedback input signal for said tuneable means (PC1, DL1, PC2, DL2) for polarization mode dispersion compensation. Said feedback signal generator (FSG) comprises polarization means for converting said transmitted optical signal to at least two optical signal components with different defined states of polarization. It has further transforming means for transforming said optical signal components into electrical signal components, wherein each electrical signal component representing one of said defined states of polarization. At least one mixer is earmarked for mixing at least two of said electrical signal components to mixed electrical signals. Means are intended for averaging said electrical signal components to average electrical signals and averaging said mixed electrical signals to average mixed electrical signals. Further means are destined for combining said average electrical signals and said average mixed electrical signals to generate said feedback input signal which is characteristic for a digital group delay of said transmission signal caused by said polarization mode dispersion.

13 Claims, 5 Drawing Sheets

OTHER PUBLICATIONS

J-X Cai et al; Automatic PMP Compensation over Transoceanic Distance with Time Varying SOP, PSP, and PMD; Optical Fiber Communication/National Fiber Optic Engineers Conf; 2008 OFC/ NFOEC 2008; Conference ON, IEEE, Piscataway, NJ; USA; Feb. 24, 2008; pp. 1-3; XP031257133.

* cited by examiner

APPARATUS AND METHOD FOR COMPENSATING POLARIZATION MODE DISPERSION

FIELD OF THE INVENTION

The invention relates to fiber optic transmission systems, and more particularly to an apparatus and a method for compensating polarization mode dispersion introduced by an optical transmission fiber when transmitting optical signals. The optical signals have a first polarization component and an orthogonal second polarization component.

BACKGROUND OF THE INVENTION

In highly dispersive pseudo-linear high bit-rate long-haul transmission systems, such as submarine or transcontinental terrestrial light wave transmission systems, intra-channel four-wave mixing (IFWM) and intra-channel cross-phase modulation (IXPM) are the main causes for nonlinear penalties. Use of a differential-phase-shift-keying (DPSK) modulation format can mitigate these penalties as compared to on-off-keying (OOK). It has also been shown that the reduced pulse energy of Return-to-Zero (RZ)-DPSK compared to RZ-OOK and a correlation between the nonlinear phase shifts of two adjacent pulses contribute to increased robustness of RZ-DPSK against IFWM.

In principle, alternating the polarization of the signal from bit to bit in two orthogonally polarized signals will further reduce the nonlinear penalties since there is little FWM between orthogonal polarization states. An improvement in the transmission distance can hence be achieved by using alternate polarization-DPSK (APol-DPSK) compared to single polarization DPSK. The simultaneous application of DPSK and polarization alternation enhances the performance in an optical transmission system where the intra-channel optical nonlinear transmission system where the intra-channel optical nonlinear interactions are a limiting factor.

With increasing data-rates, in particular up to or even more than 40 Gbit/s, polarization mode dispersion (PMD) becomes the physical effect that limits the transmission distance of an optical fiber.

Even worse, PMD is a statistical effect due to the environmental dependence of birefringence and mode-coupling of a single-mode fiber. This means that, with some probability, the instantaneous differential group delay (DGD) can be much higher or lower than the mean DGD, i.e. PMD, of the fiber.

It is to be emphasized here that when a signal experiences unacceptable high distortion due to accumulated PMD over the desired transmission distance, an active and adaptively adjustable compensation method is required to countermeasure this type of signal degradation.

Known feedback controlled optical PMD compensators (PMDC) for compensating for fiber PMD are not applicable for modulation formats using orthogonal polarization components, i.e. APol or orthogonal multiplexing formats.

Therefore, a need exists in this field of endeavor to provide a method and an apparatus for compensating polarization mode dispersion introduced by an optical transmission fiber when transmitting optical signals having a first polarization component and a orthogonal second polarization component.

SUMMARY OF THE INVENTION

Accordingly, the present invention provides an apparatus for compensating polarization mode dispersion of optical signals after transmission across an optical transmission fiber. The optical signals have a first polarization component and a orthogonal second polarization component. The apparatus contains tuneable means for compensating the polarization mode dispersion. It further contains a feedback signal generator for generating a feedback input signal for the tuneable means for polarization mode dispersion compensation. The feedback signal generator contains polarization means for splitting the transmitted optical signal into at least two optical signal components with different defined states of polarization. Moreover the feedback signal generator contains transforming means for transforming the optical signal components into electrical signal components, wherein each electrical signal component represents one of the defined polarization states. Additionally, the feedback signal generator contains at least one mixer for mixing at least two of the electrical signal components into mixed electrical signals. Furthermore, means are provided for averaging the electrical signal components to average electrical signals and averaging the mixed electrical signals to average mixed electrical signals. Furthermore, the feedback signal generator has means for combining the average electrical signals and the average mixed electrical signals to generate the feedback input signal which is characteristic for a digital group delay of the transmission signal caused through polarization mode dispersion.

The proposed solution contains means for transforming the transmitted orthogonal polarized optical signal into electrical signal components each representing one defined state of polarization. The power, in particular radio frequency (rf) power, of the electrical signals is detected for each defined state of polarization. Ideally without PMD, only such states of polarization occur that correspond to the orthogonal polarization of the original input optical signal. The power, in particular rf power, of one or more of the other defined states of polarization relative to the power of the original states of polarization gives information about the degree of polarization (DOP) caused by the fibre PMD. Hence, by combining the detected signal power, in particular rf signal power, for the defined states of polarization enables to generate an unequivocal feedback signal which solely depends on the DGD. The means for averaging the signal components enables, that the rate of the combining process for generating the feedback signal can be much lower than the bit rate of the original signal transmission. The rate of the combining process only has to fulfill the speed requirements of the feedback control of the PMDC, which for example can be in the range of 1 MHz even at hight bit rate signal transmission at 40 Gb/s. As a result the means for combining the average signals to generate the feedback signal can be operated at lower speed, which reduces the equipment costs. According to the invention, it is possible to use stand-alone as well as receiver integrated means for polarization mode dispersion compensation for high bit rate, in particular 40 Gb/s and more, long-haul transmission systems, in particular submarine transmission systems, using orthogonal polarized formats, i.e. APol-modulation formats and orthogonal multiplexing formats. Stand-alone means for polarization mode dispersion compensation have the advantage that existing receiver integrated circuits do not need to be re-designed.

In a preferred embodiment, the transmitted optical signals are modulated using alternate polarization phase shift keying (APol-PSK). This is an optimal solution for highly dispersed pseudo-linear high bit-rate long-haul transmission systems, such as submarine or transcontinental terrestrial light wave transmission systems.

In another embodiment the polarization means can comprise polarizers for converting the transmitted optical signal to optical signal components of the state of horizontal/vertical linear polarization, the state of +/−45° linear polarization and the state of left/right circular polarization.

These defined states of polarization are well suited to identify the digital group delay caused by the PMD. Additionally, reliable polarizers such as a polarimeter can be used. Known models such as Stokes parameters and Poincaré spheres can easy be used.

In another embodiment the transforming means can comprise at least two fast photodiodes for transforming the optical signal components into electrical signal components. With fast photo-diodes even a fast optical signal with a bit rate of e.g. 40 Gb/s or more can be easily transformed into electrical signals nearly synchronous to the fast signal bit rate. The electrical signal preferably is a voltage signal, but it also can be a current signal.

Preferably, the mixer can be adapted for multiplying the at least two electrical signal components to form the mixed electrical signals. Thus, fast multiplications of the electrical signal components can be performed before averaging the electrical signals. This improves the signal to noise ratio of the signals to be averaged and also of the feedback signal.

In a further embodiment the apparatus can comprise at least one rf power detector for averaging the electrical signal components and the mixed electrical signals to the average electrical signals and the average mixed electrical signals. Further the apparatus can comprise at least one analog-to-digital converter (ADC) for converting the average electrical signals into digital signals. Additionally, the apparatus can comprise a digital signal processor (DSP) for combining the digital signals to generate the feedback signal. With the rf power detectors the fast electrical signal at the output of the photo-diodes and after the mixers can be easily averaged to generate average signals with much lower bit rates as the original electrical signals. Through this, an incoming bit rate of for example 40 Gb/s can be easily transformed into a signal rate in the range of 1 Mb/s. As a result, cheap ADCs can be used, which can have a sampling rate much lower than the bit rate of the original optical signal. With the DSP, an simple calculation algorithm can be performed to generate the feedback signal from the slow digital signals coming from the ADCs.

In an alternative embodiment the apparatus can comprise at least one fast analog-to-digital converter which averages the electrical signal components and the mixed electrical signals to form the average electrical signals and the average mixed electrical signals and which converts the average electrical signals and the mixed electrical signals into digital signals. Furthermore, the apparatus can contain a digital signal processor (DSP) operable to combine the digital signals to generate the feedback signal.

Such an apparatus has the advantage that the reduction of the signal rate is performed by the fast analog-to-digital converters, which can be integrated with fast track and hold circuits. Additional means for averaging the electrical signals like rf power detectors for example are not necessary.

In another aspect, a method for compensating polarization mode dispersion introduced by an optical transmission fiber when transmitting optical signals is provided. The optical signals have a first polarization component and an orthogonal second polarization component. The inventive method comprises compensating the polarization mode dispersion of the optical transmission fiber from the transmitted optical signal using a feedback routine. The feedback routine comprises compensating the fiber polarization mode dispersion. Further it comprises generating a feedback input signal for the polarization mode dispersion compensation and adapting the compensation of the polarization mode dispersion using the feedback signal in such a way that the feedback signal is optimized. Generating the feedback input signal comprises converting the transmitted optical signal into at least two optical signal components with different defined states of polarization. Further it comprises transforming the optical signal components into electrical signal components, wherein each electrical signal component represents one of the defined states of polarization. Generating the feedback input signal further comprises mixing at least two of the electrical signal components to form mixed electrical signals. It comprises also averaging the electrical signal components to form average electrical signals and averaging the mixed electrical signals to form average mixed electrical signals and combining the average electrical signals and average mixed electrical signals to generate a feedback signal which is characteristic for a digital group delay of the transmission signal caused by the polarization mode dispersion.

According to another advantageous embodiment the optical signals can be modulated using alternate polarization phase shift keying (APol-PSK).

In an alternative embodiment the transmitted optical signal can be converted to optical signal components of the state of horizontal/vertical linear polarization, the state of +/−45° linear polarization and the state of left/right circular polarization.

In a further preferred embodiment mixing the at least two electrical signal components can comprise multiplying the at least two electrical signal components to form the mixed electrical signals.

It was found that for generating a feedback signal which gives unambiguous information about the DGD, combining the average electrical signals and the average mixed electrical signals can preferably comprise summing the squares of the average electrical signals and subtracting the average mixed electrical signals from the sum.

In another embodiment the average electrical signals and the average mixed electrical signals can be digitized before being combined to the feedback signal.

BRIEF DESCRIPTION OF THE DRAWINGS

For a better understanding of the present invention and to understand how the same may be brought into effect, reference will now be made, by way of example only, to the accompanying drawings, in which.

DETAILED DESCRIPTION OF THE INVENTION

Figure 1:
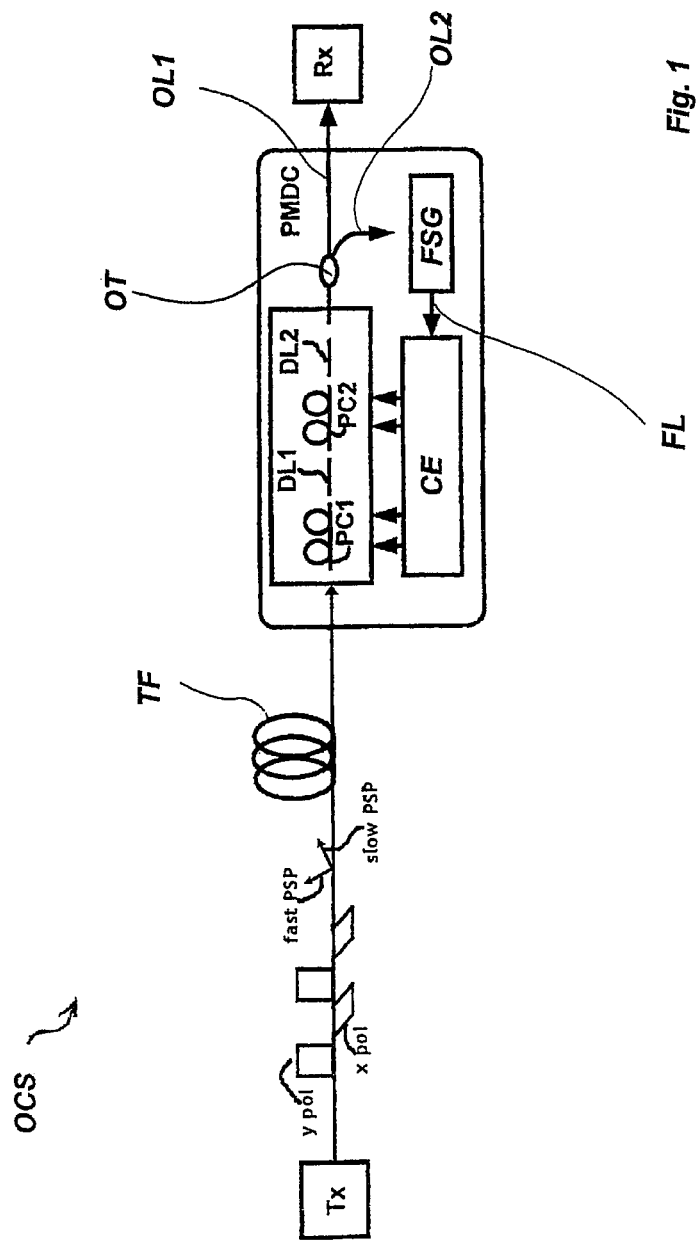
FIG. 1 illustrates schematically a first embodiment of a simplified APol-DPSK transmission apparatus using means for feedback optical polarization mode dispersion compensation.

FIG. 1 shows an optical communication system OCS for an alternate-polarization differential-phase-shift-keying (APol-DPSK) transmission. The optical communication system OCS is adapted for submarine or transcontinental terrestrial light wave transmission. The optical communication system OCS includes an optical transmitter Tx, an optical transmission fiber TF, a feedback controlled two-stage polarization mode dispersion compensator PMDC and an optical receiver Rx.

The transmitter Tx is adapted to generate the APol-DPSK transmission signal with a bit rate of 40 Gb/s. The alternating orthogonal TE and TM modes of the APol-DPSK transmission signal are sketched out exemplary as square-wave signals "x pol" and "y pol".

By means of the polarization mode dispersion compensator PMDC the polarization mode dispersion (PMD) of the fiber TF can be compensated. The propagation constants for different polarizations are sketched out as arrows "fast PSP" and "slow PSP". The propagation constants "fast PSP" and "slow PSP" are different due to the fiber PMD. The polarization mode dispersion compensator PMDC includes a first stage polarization converter PC1, a first stage delay line DL1, a second-stage polarization converter PC2, a second stage delay line DL2. The delay lines DL1 and DL2 are realized using polarization maintaining fibers. The output of the fiber TF is coupled to the input of the first stage polarization converter PC1. The output of the second-stage delay line DL2 is coupled via a first optical link OL1 to the receiver Rx. The first optical link OL1 has an optical tap OT from where a second optical link OL2 leads to a feedback signal generator FSG of the PMDC. By means of the optical tap OT approximately 10% of the signal power in the first optical link OL1 is coupled out via the second optical link OL2 to the feedback signal generator FSG.

The feedback signal generator FSG is adapted to generate a feedback input signal from the extracted fraction of the transmission signal.

Figure 2:
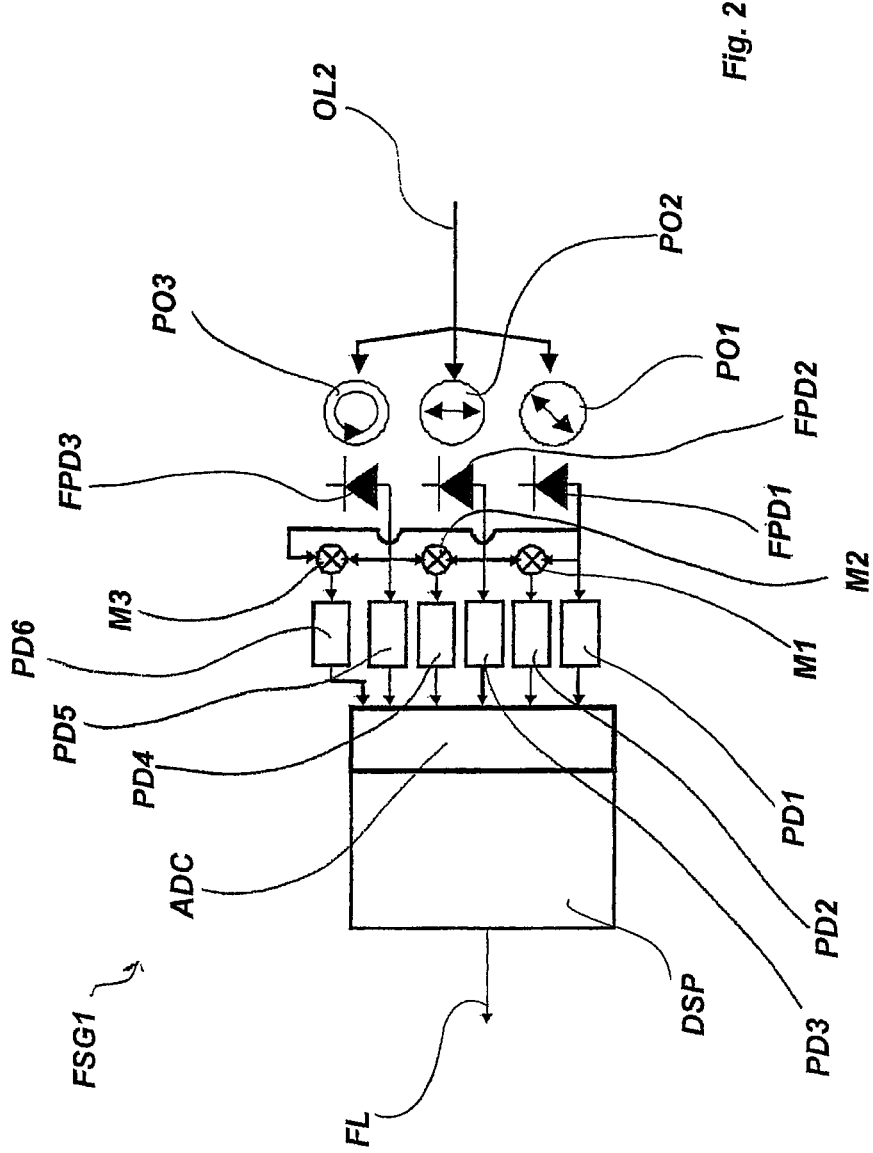
FIG. 2 illustrates schematically a first embodiment of a simplified feedback signal generator that may be used in the APol-DPSK transmission apparatus of FIG. 1.

A first embodiment of the feedback signal generator FSG is shown in FIG. 2 and designated there as FSG1.

The feedback signal generator FSG1 comprises three polarizers PO1, PO2 and PO3 for converting the extracted optical signal to three optical signal components with different defined states of polarization.

The polarizer PO1 converts the extracted optical signal to optical signal components of the state of +/−45° linear polarization. The polarizer PO2 converts the optical signal to the state of horizontal/vertical linear polarization, and the polarizer PO3 converts the optical signal to the state of left/right circular polarization.

The optical output of each polarizer PO1, PO2 and PO3 is connected to a respective fast photodiode FPD1, FPD2 and FPD3. The photodiodes FPD1, FPD2 and FPD3 are adapted for transforming the optical signal components into electrical rf power signal components, wherein each electrical signal component represents one of the defined states of polarization. In principle the polarizers PO1, PO2 and PO3 and the fast photodiode FPD1, FPD2 and FPD3 have a similar function as a fast polarimeter for slicing out three states polarizations from the extracted optical transmission signal. The term "fast" in context of this embodiment means that in particular the transformation rate, e.g. the slicing out rate, is in the order of the bit rate of the transmission signal, i.e. 40 Gb/s.

The output of the photodiode FPD1 is connected to the input of a mixer M1, to the input of a mixer M3 and to the input of a rf power detector PD1. The output of the photodiode FPD2 is connected to the input of the mixer M1, to the input of a mixer M2 and to the input of a rf power detector PD3. The output of the photodiode FPD3 is connected to the input of the mixer M2, the input of the mixer M3 and to the input of a rf power detector PD5. The output of the mixer M1 is connected to the input of a rf power detector PD2. The output of the mixer M2 is connected to the input of a rf power detector PD4. The output of the mixer M3 is connected to the input of a rf power detector PD6.

The mixers M1 to M3 multiply the respective incoming electrical signals from the photodiodes FPD1 to FPD3 to mixed electrical rf power signals. The mixed electrical signals are available at the respective outputs of the mixers M1 to M3.

The rf power detectors PD1 to PD6 average the electrical signal components from the photodiodes FPD1 to FPD3 and the mixed electrical signals from the mixers M1 to M3 to corresponding average electrical signals. Those average electrical signals are available at the respective outputs of the rf power detectors PD1 to PD6.

The outputs of the rf power detectors PD1 to PD6 are coupled to respective inputs of an analog-to-digital converter ADC. The ADC converts the average electrical signals to corresponding digital signals.

The ADC is linked to a digital signal processor DSP for transmitting the digital signals. The DSP combines the digital signals to generate the feedback signal which is characteristic for a digital group delay DGD of the optical transmission signal caused by the fiber PMD. The output of the DSP is connected to a feedback signal line FL.

The output of the feedback signal generator FSG is connected via the feedback signal line FL to an input of a control circuit CE of the PMDC. Signal outputs of the control circuit CE are coupled to control inputs of the polarization converters PC1 and PC2. The polarization converters PC1 and PC2 hence are feedback controlled in dependence of the feedback input signal, and therefore dependent on the degree of DGD.

Figure 4:
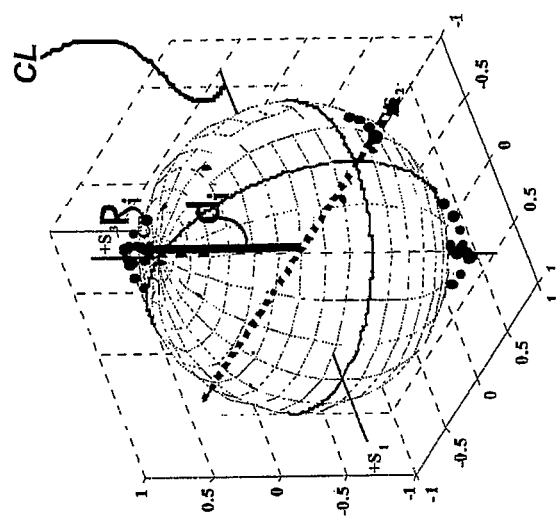
FIG. 4 illustrates schematically the states of polarization analog to FIG. 3 for a higher fiber DGD.
Figure 3:
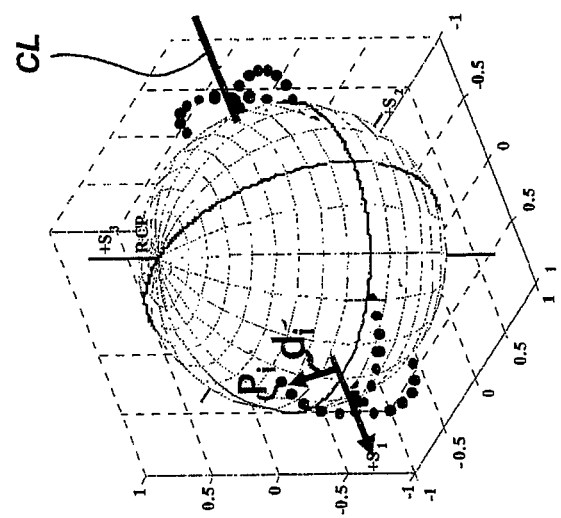
FIG. 3 illustrates schematically the states of polarization of optical signals transmitted with the apparatus of FIG. 1 in a Poincaré sphere in case of low fiber DGD.

FIGS. 3 and 4 show the evolution of the signal polarization versus time exemplary as points $P_i$ of a Poincaré sphere. The evolution of the signal polarization is drawn by the output signals of the three photo diodes FPD1 to FPD3.

It was found, that the polarization state (SOP) of the APol-DPSK transmission signal for nearly no PMD evolves as shown as traces on the Poincaré sphere in FIG. 3. Then the points $P_i$ of the traces are close to a center line CL, which is the weighted center axis of all points $P_i$. The average distance $d_i$ of the traces to the center line CL, which is sketched out by the length of an arrow $d_i$, is small.

The evolution of the polarization state for higher PMD is shown in FIG. 4. In this case, the average distance $d_i$ increases compared to the case shown in FIG. 3.

Figure 5:
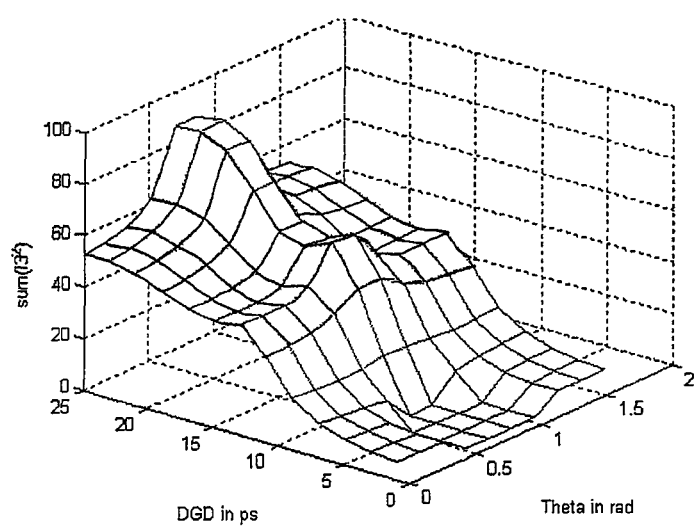
FIG. 5 illustrates schematically a three dimensional graph of the average distance of states of polarization from the optimal state of polarization plotted in the Poincaré spheres of FIGS. 3 and 4, which can be used for feedback control of the PMD compensation, versus input polarization state and fiber DGD.

The diagram of FIG. 5 shows that the sum of the distances $d_i$, vertical axis named "sum di", in the Poincaré sphere is dependent on the input polarization state of the PMDC, axis named "theta in rad", and the fiber DGD, axis named "DGD in ps". The distance $d_i$ is monotonically decreasing in the region of low fiber DGD, which means low distortion from the fiber PMD, and hence fulfills the requirement for a feedback signal. For compensating the fiber PMD, a suitable feedback routine can minimize the sum of the distances $d_i$ for minimizing the DGD. Exemplary feedback routines stated below can be performed by the above described feedback signal generators FSG; FSG1 or a second embodiment of a feedback signal generator FSG2, shown in FIG. 6, which is described below. The control electronics CE can adapt the first-stage polarization converter PC1 and the second-stage polarization converter PC2 such, that the feedback signal is minimized to reduce the DGD ideally to zero.

For compensating the fiber PMD exemplary the following method can be performed.

It is assumed that the APol-DPSK transmission signal with a signal bit rate of approximately 40 Gb/s is generated by the transmitter Tx and transmitted via the fiber TF to the polarization mode dispersion compensator PMDC.

The feedback routine for compensating the fiber PMD is executed as follows.

The feedback input signal is generated from the compensated APol-DPSK transmission signal by means of the feedback signal generator FSG. In the first embodiment of the feedback signal generator FSG1 shown in FIG. 2, this is done as follows:

The extracted compensated APol-DPSK transmission signal is converted by means of the polarizers PO1 to PO3 to optical signal components of the state of horizontal/vertical linear polarization, the state of +/−45° linear polarization and the state of left/right circular polarization.

The optical signal components are transformed into electrical signal components by means of the fast photo diodes FPD1 to FPD3, wherein each electrical signal component represents one of the defined states of polarization.

The electrical signal components at the outputs of the fast photo diodes FPD1 and FPD2 are multiplied by means of the mixer M1 to a first mixed electrical signal. The electrical signal components at the outputs of the fast photo diodes FPD2 and FPD3 are multiplied by means of the mixer M2 to a second mixed electrical signal. The electrical signal components at the outputs of the fast photo diodes FPD1 and FPD3 are multiplied by means of the mixer M3 to a third mixed electrical signal.

By means of the rf power detectors PD1 to PD6 the electrical signal components at the outputs of the fast photo diodes FPD1 to FPD3 are averaged to average electrical signals and the mixed electrical signals at the outputs of the mixers M1 to M3 are averaged to average mixed electrical signals.

The average electrical signals and the average mixed electrical signals at the outputs of the rf power detectors PD1 to PD6 are digitized by means of the ADC.

For minimizing the distances $d_i$ the basic idea is to maximize the three average electrical output signals of the rf power detectors PD1, PD3 and PD5, which represent the outputs of the fast photo diodes FPD1 to FPD3, and to minimize the three average electrical output signals of the rf power detectors PD2, PD4 and PD6, which correspond to the electrical output signals of the mixers M1 to M3 and hence to the products of the electrical output signals of the fast photo diodes FPD1 to FPD3. Therefore each squares of all average electrical signals are summed and all average mixed electrical signals are subtracted from the sum. The result then leads to the feedback signal.

The following reduced formula describes the principle of the above calculation:

$$FS = Urf1^2 + Urf2^2 + Urf3^2 - Urf1 \times Urf2 - Urf1 \times Urf3 - Urf2 \times Urf3$$

wherein FS is the feedback signal. Urf1, Urf2 and Urf3 are output voltages at the outputs of the rf power detectors PD1, PD3 and PD5. These voltages are proportional to the microwave power, i.e. the electrical power, of the output signals of the fast photo diodes FPD 1 to FPD3. The terms $Urf1 \times Urf2$, $Urf1 \times Urf3$ and $Urf2 \times Urf3$ can be generated by means of the mixers M1 to M3 and the rf power detectors PD2, PD4 and PD6. The squares $Urf1^2$, $Urf2^2$ and $Urf3^2$ can be generated by means of a signal processor. The sums and the differences are also generated by means of the signal processor. In reality according to the invention, the output signals of the rf power detectors PD1 to PD6 are digitized by means of the ADC before calculation by means of the DSP.

Since only the rf power levels are measured by the three fast photo diodes PO1 to PO3 rather than using the fast signal samples of the fast photo diodes FPD1 to FPD3, the DSP needs to conform only to the speed requirements of the feedback signal, which can be in the range of 1 MHz instead of the signal bit rate of approximately 40 Gb/s.

The feedback input signal generated by the feedback signal generator FSG; FSG1; FSG2 is transmitted via the feedback signal line CL to the control electronics CE. The first-stage polarization converter PC1 and the second-stage polarization converter PC2 are adapted by means of the control electronics CE thus, that the feedback input signal is minimized.

Figure 6:
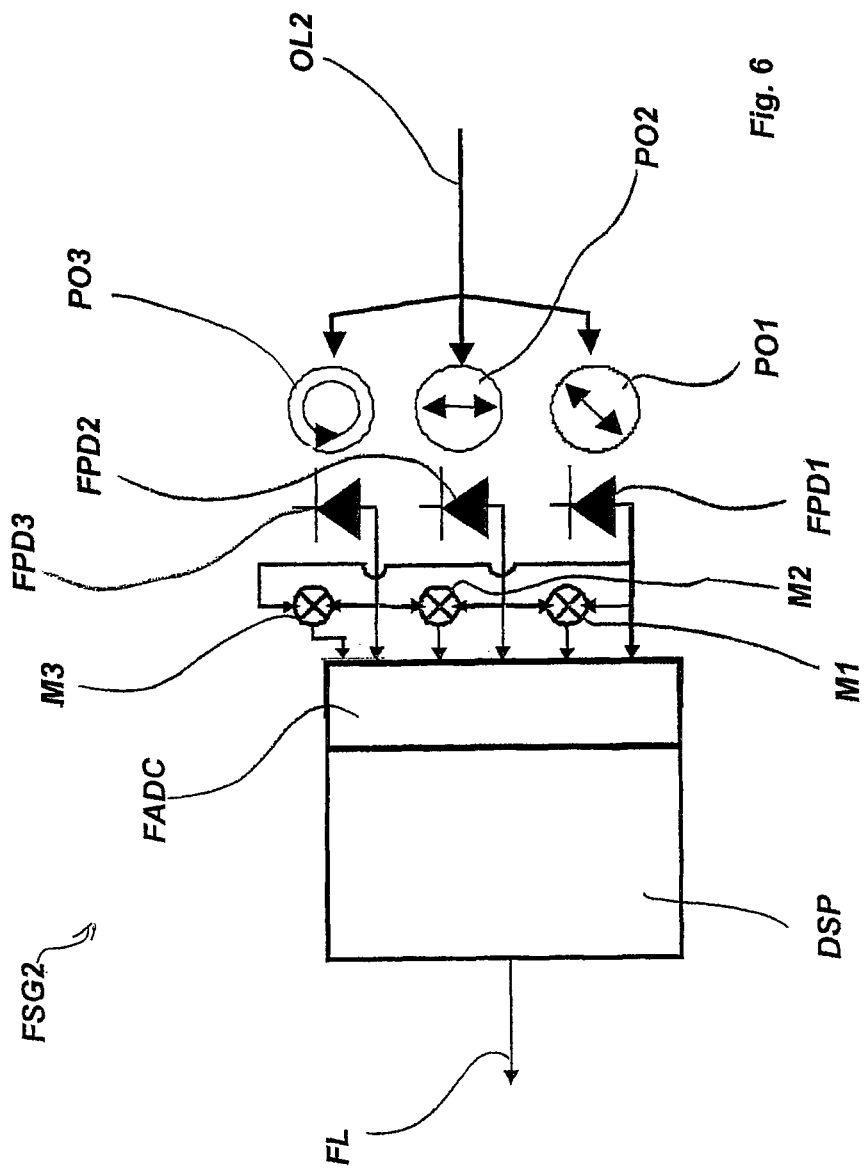
FIG. 6 illustrates schematically a second embodiment of a simplified feedback signal generator which is similar to that of FIG. 2 that may be used in the APol-DPSK transmission apparatus of FIG. 1.

A second embodiment of the feedback signal generator FSG is shown in FIG. 6 and named there as FSG2. The feedback signal generator FSG2 is similar to the first embodiment of the feedback signal generator FSG1 shown in FIG. 2. The elements which are identical to those of the first feedback signal generator FSG1 have the same reference marks, so that their description will refer to the explanation of the first embodiment. Unlike to the first embodiment, the feedback signal generator FSG2 has no rf power detectors PD1 to PD6. Instead of this, the feedback signal generator FSG2 contains a fast analog digital converter FADC which is adapted for averaging the electrical signal components and the mixed electrical signals coming from the photodiodes FPD1 to FPD3 and the mixers M1 to M3 to the average (mixed) electrical signals and for converting the average (mixed) electrical signals to digital signals. The fast analog digital converter FADC can have a lower sampling rate as the ADC of the first embodiment. It has a resolution of a few picoseconds, for example. As an example, the fast analog digital converter FADC can be realized on a subrate with a fast track and hold circuit. The fast analog digital converter FADC allows to measure directly the temporal evolution of the signal state of polarization as shown in FIGS. 3 and 4 as points $P_i$ on the Poincaré sphere. The digital signal processor DSP then directly calculates the sum of the distances $d_i$ plotted in FIG. 5.

For all of the above shown embodiments the following modifications are possible:

Instead of the three mixers M1 to M3 only two or one mixer can be used with different performance.

Instead of the photodiodes FPD1 to FPD3 other kinds of means for transforming the optical signal components into electrical signal components, for example diode arrays or charge coupled devices (CCD), can be used.

Instead of the three polarizers POL1, POL2 and POL3 other kinds of means adapted for converting the transmitted optical signal to optical signal components with different defined states of polarization can be used. It is also possible to generate more or less than three optical signal components.

The invention is also advantageous for signal bit rates different from 40 Gbit/s.

Instead of alternate polarization APol signals other kinds of optical signals having a first polarization component and a orthogonal second polarization component, for example orthogonal multiplexing formats, can be used.

Instead of APol-DPSK modulation, the invention is also suitable for other kinds of PSK modulation, such as binary phase-shift keying (BPSK), quadrature phase-shift keying (QPSK), off-set QPSK (OQPSK), •/4-QPSK and SOQPSK. Return to zero RZ-(D)PSK and also non return to zero (NRZ)-(D)PSK can be used.

The PMDC can also be realized with more or less than two stages. In an alternative implementation, the PMDC can be implemented for example by a single polarization converter and a variable delay line instead of two polarization converters and first and second stage delay lines.

Instead of being integrated in the PMDC, the feedback signal generator FSG; FSG1; FSG2 can be a stand-alone device.

The PMDC and/or the feedback signal generator FSG; FSG1; FSG2 can be integrated with the receiver Rx.

What is claimed is:

1. An apparatus for compensating polarization mode dispersion for an optical transmission fiber for transmission of optical signals, said optical signals having a modulation format using a first polarization component and an orthogonal second polarization component comprising:
    tuneable means adapted to compensating said fiber polarization mode dispersion;
    a feedback signal generator adapted to generating a feedback input signal for said tuneable means for polarization mode dispersion compensation,
wherein said feedback signal generator comprises
    polarization means for converting said transmitted optical signal to at least two optical signal components with different defined non-orthogonal states of polarization,
    transforming means for transforming said optical signal components into electrical signal components, wherein each electrical signal component represents one of said defined non-orthogonal states of polarization,
    at least one mixer for mixing at least two of said electrical signal components to mixed electrical signals,
    means for averaging said electrical signal components to average electrical signals and averaging said mixed electrical signals to average mixed electrical signals,
    means for combining said average electrical signals and said average mixed electrical signals to generate said feedback input signal which is characteristic for a digital group delay of said transmission signal caused by said polarization mode dispersion.

2. The apparatus of claim 1, wherein the transmitted optical signals are alternate polarization phase shift keyed.

3. The apparatus of claim 1, wherein said polarization means comprising polarizers adapted for converting said transmitted optical signal to optical signal components of the state of horizontal/vertical linear polarization, the state of +/−45° linear polarization and the state of left/right circular polarization.

4. The apparatus of claim 1, wherein said transforming means comprising at least two fast photodiodes for transforming said optical signal components into electrical signal components.

5. The apparatus of claim 1, wherein said mixer is adapted for multiplying said at least two electrical signal components to said mixed electrical signals.

6. The apparatus of claim 1 comprising
    at least one rf power detector for averaging said electrical signal components and said mixed electrical signals to said average electrical signals and said average mixed electrical signals,
    at least one analog digital converter for converting said average electrical signals to digital signals and
    a digital signal processor for combining said digital signals to generate said feedback signal.

7. The apparatus of claim 1 comprising
    at least one fast analog digital converter which is adapted for averaging said electrical signal components and said mixed electrical signals to said average electrical signals and said average mixed electrical signals and for converting said average electrical signals and said average mixed electrical signals to digital signals and
    a digital signal processor for combining said digital signals to generate said feedback signal.

8. A method for compensating polarization mode dispersion for an optical transmission fiber for transmission of optical signals, said optical signals having a modulation format using a first polarization component and a orthogonal second polarization component, comprising:
    compensating said polarization mode dispersion of said optical transmission fiber from said transmitted optical signal using a feedback routine, wherein said feedback routine comprises
    compensating said fiber polarization mode dispersion;
    generating a feedback input signal for said polarization mode dispersion compensation,
    adapting said compensation of said polarization mode dispersion by use of the feedback signal thus that the feedback signal is optimized,
wherein generating said feedback input signal comprises
    converting said transmitted optical signal to at least two optical signal components with different defined non-orthogonal states of polarization,
    transforming said optical signal components into electrical signal components, wherein each electrical signal component is representing one of said defined non-orthogonal states of polarization,
    mixing at least two of said electrical signal components to mixed electrical signals,
    averaging said electrical signal components to average electrical signals and averaging said mixed electrical signals to average mixed electrical signals,
    combining said average electrical signals and average mixed electrical signals to generate a feedback signal which is characteristic for a digital group delay of said transmission signal caused by said polarization mode dispersion.

9. The method of claim 8 wherein the optical signals are alternate polarization phase shift keyed.

10. The method of claim 8 wherein said transmitted optical signal are converted to optical signal components of the state of horizontal/vertical linear polarization, the state of +/−45° linear polarization and the state of left/right circular polarization.

11. The method of claim 8 wherein mixing said at least two electrical signal components comprises multiplying said at least two electrical signal components to said mixed electrical signals.

12. The method of claim 11 wherein combining said average electrical signals and said average mixed electrical signals comprising summing the squares of the average electrical signals and subtracting said average mixed electrical signals from the sum.

13. The method of claim 11 wherein said average electrical signals and said average mixed electrical signals are digitized before being combined to said feedback signal.

* * * * *